Nov. 23, 1948.　　　K. W. GIBBS ET AL　　　2,454,442
CEMENT BLOCK MACHINE

Filed Sept. 13, 1946　　　　　　　　　　　　3 Sheets-Sheet 1

Inventors
KELLY W. GIBBS
ROY HILLMAN

By Randolph & Beavers
Attorneys

Nov. 23, 1948.  K. W. GIBBS ET AL  2,454,442
CEMENT BLOCK MACHINE
Filed Sept. 13, 1946  3 Sheets-Sheet 2
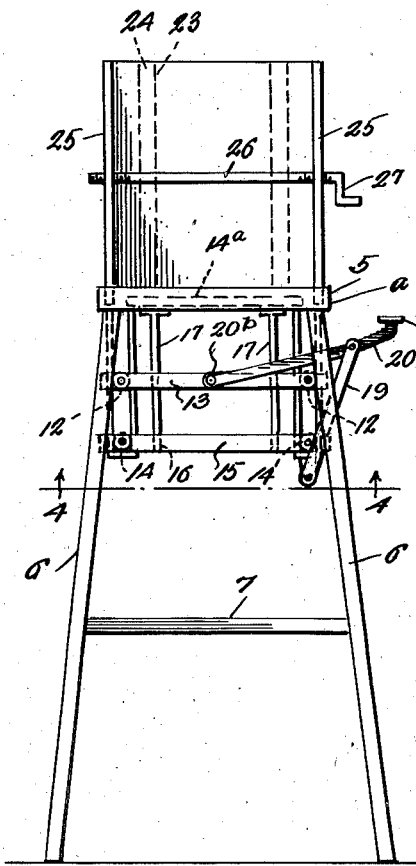
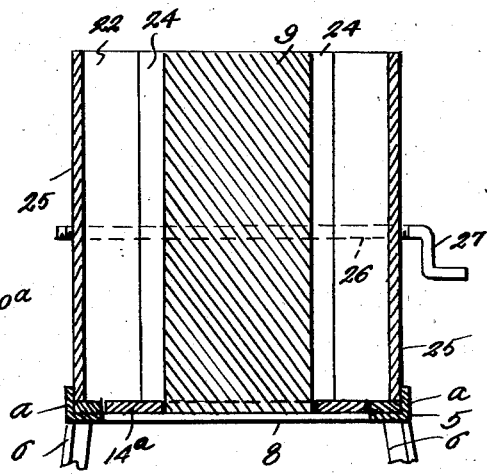
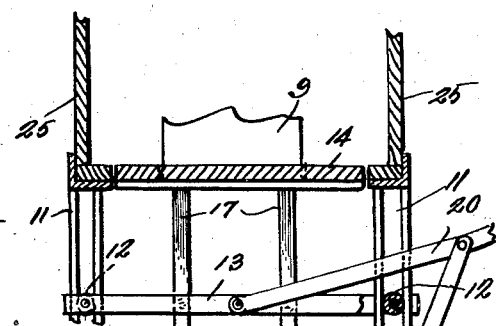
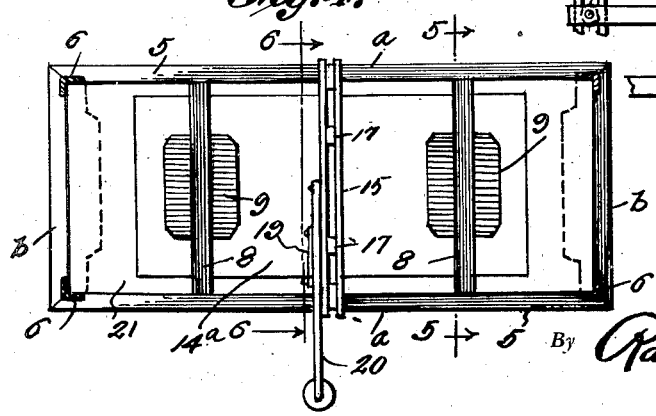
Inventors
KELLY W. GIBBS
ROY HILLMAN
By Randolph & Beavers
Attorneys

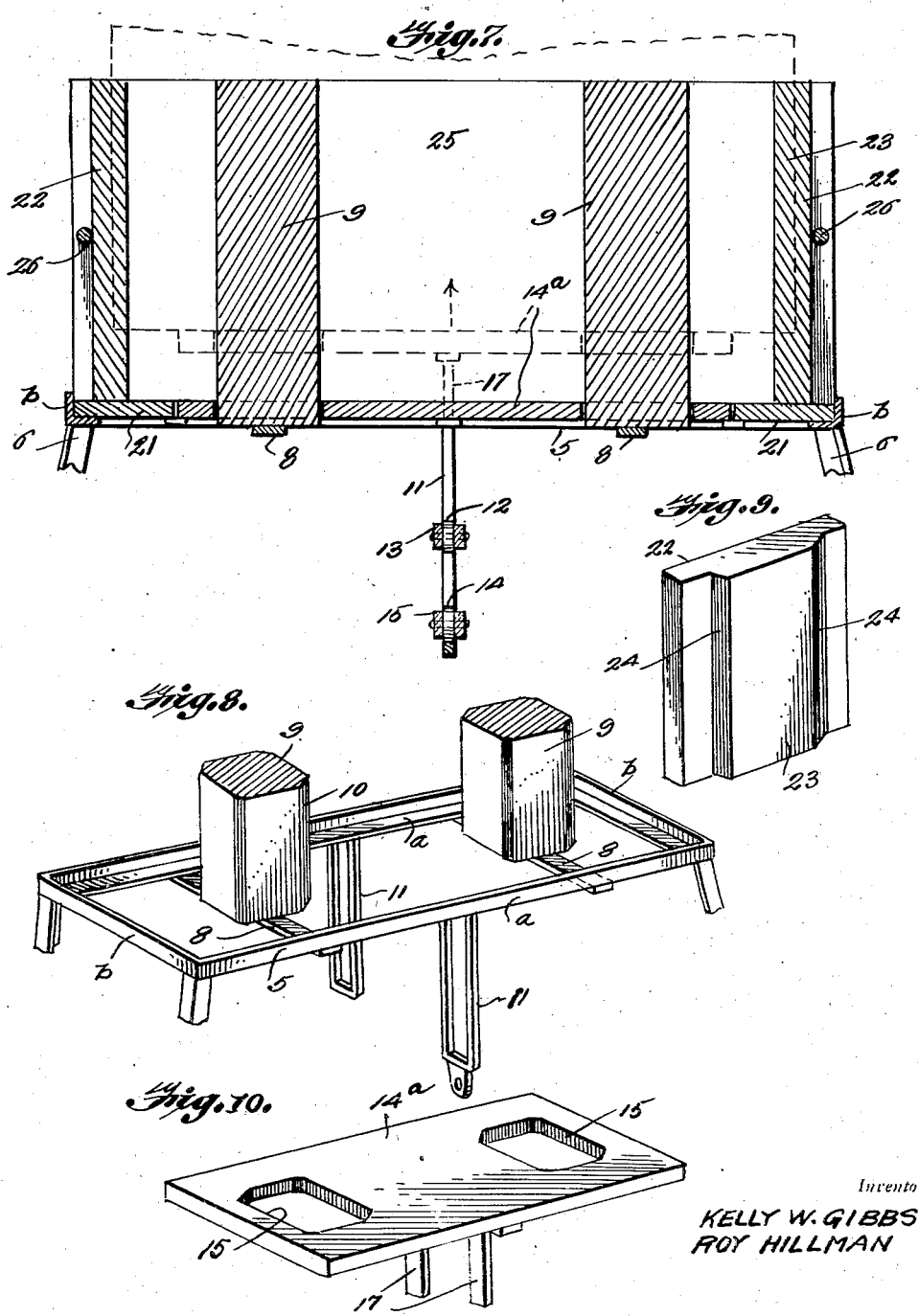

Patented Nov. 23, 1948

2,454,442

UNITED STATES PATENT OFFICE 2,454,442

CEMENT BLOCK MACHINE

Kelly W. Gibbs and Roy Hillman, Ashland, Ky.

Application September 13, 1946, Serial No. 696,644

2 Claims. (Cl. 25—41)

1

This invention relates to cement block forming machines, the principal object being to provide such an apparatus capable of turning out cement blocks in a quick and efficient manner without requiring tedious and laborious effort on the part of the attending workmen.

The principal object of the present invention is to provide a cement block forming machine into which quick drying cement can be poured and at the proper interval ejected in the form of a block, which can be set aside on a rack or other support for drying.

Another important object of the invention is to provide a cement block forming machine wherein the semihardened block is lifted bodily in the mold and off of tapered cores, thus alleviating to a considerable extent damage and waste which presently occurs in machines where the cores are moved away from the formed block.

Still another object of the invention is to provide a machine of this character which can be quickly taken apart and repaired or stored in a limited space.

A further object of the invention is to provide a mechanical apparatus for forming cement blocks wherein but a minimum expenditure of human effort is necessary in removing the formed block without the presence of obstacles or structure hindering such action and which in present day machines frequently result in damage to the semi-hard block.

Still a further object of the invention is to provide a machine of this character which is positive-acting and not susceptible to the ready development of defects.

These and various other objects and advantages of the invention will become apparent to the reader of the following description.

In the drawings:

Figure 3 is an end elevational view.

Figure 4 is a cross sectional view taken substantially on a line 4—4 of Figure 3 and looking at the bottom of the forming box.

Figure 5 is a section taken substantially on line 5—5 of Figure 4.

Figure 6 is a fragmentary vertical sectional view taken substantially on line 6—6 of Figure 4.

Figure 7 is an enlarged longitudinal fragmentary sectional view.

Figure 8 is a fragmentary perspective view showing the frame and portions of the cores.

Fig. 9 is a perspective view of one of the end walls.

2

Figure 1:
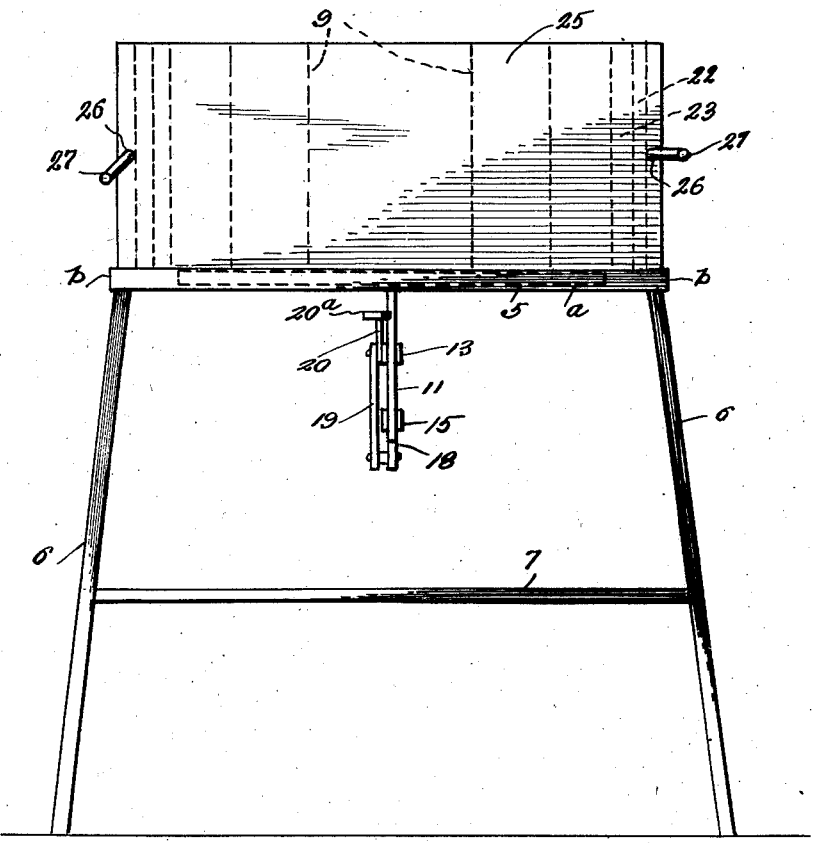
Figure 1 is a side elevational view of the machine.
Figure 2:
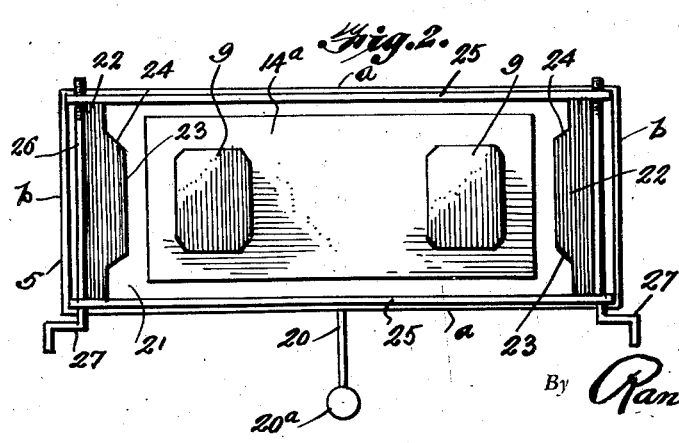
Figure 2 is a top plan view.

Figure 10 is a fragmentary perspective view of the pallet or elevator.

Referring to the drawings, numeral 5 denotes a rectangular shaped frame of angular construction, supported at its corners by angle legs 6, the legs being connected at their intermediate portions by brace bars 7.

Adjacent each end of the frame 5 is a cross bar 8 and secured to these cross bars are vertically disposed cores 9 of substantially rectangular cross section with their edges bevelled off as at 10.

The frame 5 is made of side members $a$, $a$ and end members $c$, $b$. The medial portions of the side members $a$, $a$ are provided with depending and slotted guides 11 in which upper rollers 12 on an upper transverse bar 13 ride and also lower rollers 14 at the ends of a lower horizontal or transverse bar 15, these bars 13, 15 being welded or otherwise secured as at 16 to vertical legs 17, 17 which bear against the bottom of a pallet or elevator plate 14a.

A lug 18 depends from the front slotted guide 11 and to this is pivotally secured, the lower end of a link bar 19, the other end being pivotally secured to the intermediate portion of a treadle arm 20 having a pedal 20a at its outer end and a pivotal connection between its inner end and the medial portion of the transverse bar 13, as at 20b.

Rising from the bottom section 21 are end walls 22, 22 each having an inwardly disposed boss 23 at its inner side somewhat narrower than the width of the wall and having its corner portions bevelled off as at 24.

Side walls 25, 25 have their lower edges resting upon the inturned flanges of the side members $a$, $a$ of the frame 5 and abutt the side edges of the ends walls 22, 22 as shown in Figure 3.

Through the end portions of the side walls 25, 25 are disposed screw shafts 26, each provided with a crank handle 27, at one end, whereby the end walls can be drawn in snug engagement with the vertical edge faces of the end walls 22.

It is to be understood, that the cores 9 have a slight vertical taper to facilitate dislodgement of the semi-solid blocks therefrom when the block is lifted by the elevator plate 14a.

Material for use in the block can be prepared by a conventional concrete mixer or by hand with a shovel. The material is poured into the box-like structure, to the proper height and due to the quick-drying property of the cement, the block is ready to be removed to a drying rack, or the like, in a short while.

When the semi-hard block is sufficiently hardened to be removed, pressure is exerted on the pedal 20, which forces the vertical members 17 upwardly, lifting the pallet or elevator 14a. If desired, the end walls 22 can be removed and the block lifted by the elevator 14a, that is by hand, and transported to a point where the block is allowed to dry.

It may be desirable to have a metal plate under the pallet or elevator 14a, but for general purposes, it has been found that the use of a cross bar transversely under the elevator 14, is sufficient.

Obviously, the structure can be readily demounted for convenient transportation, and further, due to the lightness of the machine, the same can be bodily transported from one near point to another.

The parts of the machine can be constructed of inexpensive material.

While the foregoing description has set forth the invention in specific terms, it is to be understood that numerous changes in the shape, size and materials may be resorted to, without departing from the spirit and scope of the invention as claimed hereinafter.

Having described the invention, what is claimed as new is:

1. A block forming machine comprising a frame having side bars and end bars formed with upstanding flanges, guide bars extending downwardly from the side bars and formed with vertical slots, one guide bar having an ear at its lower end, cross bars extending between the side bars, vertical cores rising from the cross bars, a bottom carried by said frame and having end sections and an intermediate section, the intermediate section constituting a pallet free from the frame and being formed with openings through which the cores pass, side and end walls removably resting upon the bottom and releasably held upright in engagement with each other, push bars extending downwardly from said pallet and spaced from each other transversely thereof, upper and lower horizontal bars secured to the push bars and extending transversely of said frame and carrying rollers engaged in the slots of the guide bars, a treadle pivoted to the upper horizontal bar and projecting outwardly from a side of the frame, and a link pivoted at its lower end to the ear and at its upper end to the treadle outwardly of the frame.

2. A block forming machine comprising a frame, cores carried by said frame, a bottom carried by said frame and including a section formed with openings through which the cores pass and constituting a pallet shiftable vertically, side walls and end walls releasably mounted upright upon the bottom, guides extending downwardly from opposite sides of the frame and formed with vertical slots, push bars extending downwardly from the pallet and spaced from each other transversely thereof, cross bars carried by said push bars and carrying rollers rotatably engaged in the slots of said guides, a treadle extending transversely of said frame and having its inner end pivoted to one cross bar and its outer portion projecting from a side of the frame, and a link pivoted to the treadle and to the lower end of the adjacent guide.

KELLY W. GIBBS.
ROY HILLMAN.

REFERENCES CITED

The following references are of record in the file of this patent:

UNITED STATES PATENTS

| Number | Name | Date |
|---|---|---|
| 752,298 | Perrin | Feb. 16, 1904 |
| 812,336 | Glatfelter | Feb. 13, 1906 |